United States Patent [19]

Koch

[11] 4,118,550

[45] Oct. 3, 1978

[54] APROTIC SOLVENT ELECTROLYTES AND BATTERIES USING SAME

[75] Inventor: Victor R. Koch, Framingham, Mass.

[73] Assignee: EIC Corporation, Newton, Mass.

[21] Appl. No.: 836,731

[22] Filed: Sep. 26, 1977

[51] Int. Cl.² .............................................. H01M 6/14
[52] U.S. Cl. ................................... 429/194; 429/197; 429/199
[58] Field of Search ............... 429/194, 197, 198, 199, 429/218; 252/62.2, 500, 510, 518

[56] References Cited

U.S. PATENT DOCUMENTS

| | | | |
|---|---|---|---|
| 3,701,688 | 10/1972 | Gabano et al. | 429/197 |
| 3,778,310 | 12/1973 | Garth | 429/197 |
| 3,877,983 | 4/1975 | Hovsepian | 429/194 |
| 4,002,492 | 1/1977 | Rao | 429/194 |

*Primary Examiner*—Charles F. LeFevour
*Attorney, Agent, or Firm*—Schiller & Pandiscio

[57] ABSTRACT

The invention comprises using selected alkylated analogs of tetrahydrofuran and tetrahydropyran as solvents for electrolytes in batteries having alkali metal negative electrodes.

20 Claims, 4 Drawing Figures

APROTIC SOLVENT ELECTROLYTES AND BATTERIES USING SAME

The Government of the U.S.A. has rights in this invention pursuant to Contract N00014-77-C-0155 awarded by the Department of the Navy.

This invention relates to electrochemical cells and more particularly to improved non-aqueous electrolytes for cells incorporating negative electrodes comprising highly reactive alkali metals, and especially lithium-containing anodes.

Extensive efforts have been expended in developing electrochemical cells with negative electrodes made of lithium and lithium alloys. The primary reason for the interest in lithium as an electrode material is the fact that it is highly electronegative as well as having a low atomic weight, thereby making possible cells with high energy density. Another important consideration is that lithium electrodes are inherently rechargeable. Lithium can be electrodeposited back onto a conducting anode substrate from solutions containing lithium ions. However, the use of lithium electrodes presents certain problems which have severely hampered the development of secondary, i.e., rechargeable, batteries, particularly ambient temperature batteries. For one thing, lithium is highly reactive and this limits the number of potential solvents that may be used for dissolving appropriate lithium salts to form the required electrolyte. Lithium reaction with a solvent in an electrochemical cell is undesirable since it leads to self-discharging and early battery failure. Another problem is that in the usual case where lithium reacts with the organic solvent component of an electrolyte, the reaction leads to formation of a surface film. If the lithium is not plated smoothly, as tends to be the case when individual lithium grains become encapsulated by the film, subsequently plated lithium tends to be deposited in dendritic form, and the formed dendrites provide an increased surface area which promotes further film formation and encapsulation, thereby speeding up rapid deterioration of cycling efficiency and ultimate failure.

One approach to reducing the self-discharging problem has been to alloy the lithium with a less reactive metal such as aluminum. While this lowers the reactivity of the lithium, it also has the adverse affect of increasing the weight of the electrode and making it more positive than a pure lithium electrode. Another more favored approach has been to develop electrolytes where the required salts are dissolved in aprotic organic solvents which do not react readily with lithium. A large number of organic solvents have been suggested and investigated in connection with various types of cells containing lithium electrodes, e.g. cells with different positive electrode materials and/or different electrolyte salts, and cells with and without mechanical separator means between the electrodes.

Cyclic ethers have been proposed as the solvent component of organic electrolyte solutions and heretofore tetrahydrofuran, an aliphatic cyclic ether commonly referred to as THF, has been studied in depth since it has a number of physical and chemical properties which favor its use in a secondary lithium battery. In particular, THF has a wide liquid range (−108° C. to +65° C. at 1 atm.) and low viscosity (0.461 cp. at 25° C.), forms highly conductive solutions of lithium salts, and generally manifests low chemical reactivity. It also has been found to react less readily with lithium than many other solvents that have been studied. Nevertheless the reactivity of THF with respect to lithium is still sufficiently great to render it unsuitable for Li secondary battery applications, and particularly for ambient temperature batteries, i.e., batteries operating in the vicinity of 25° C.

Accordingly, one primary object of this invention is to provide an improved electrolyte for electrochemical cells which comprise an alkali metal negative electrode.

A second primary object is to provide a new and improved electrochemical cell of the type comprising an alkali metal negative electrode.

Another object of the invention is to provide an improved electrolyte for a cell having a lithium-containing electrode which comprises an organic solvent that is substantially more inert than tetrahydrofuran with respect to lithium yet has a conductivity sufficiently great to provide a cell of relatively low internal resistance at ambient temperatures.

Still another object is to provide a "lithium battery" (socalled because its negative electrode material consists of or is predominantly lithium) which is rechargeable, has a high cycling efficiency and high power density at ambient temperatures, and is useable at ambient temperatures.

These objects are attained by providing an aprotic solvent electrolyte which essentially comprises 2-methyltetrahydrofuran (2-Me-THF), 2,5-dimethyltetrahydrofuran (2,5-di-Me-THF), 2-methyltetrahydropyran (2-Me-THP), 2,6-dimethyltetrahydropyran (2,6-di-Me-THP), and higher alkyl homologs of the foregoing.

Other features and many of the attendant advantages of the invention are set forth in or made obvious by the following detailed description of the invention which is to be considered together with the accompanying drawings wherein.

Figure 1:
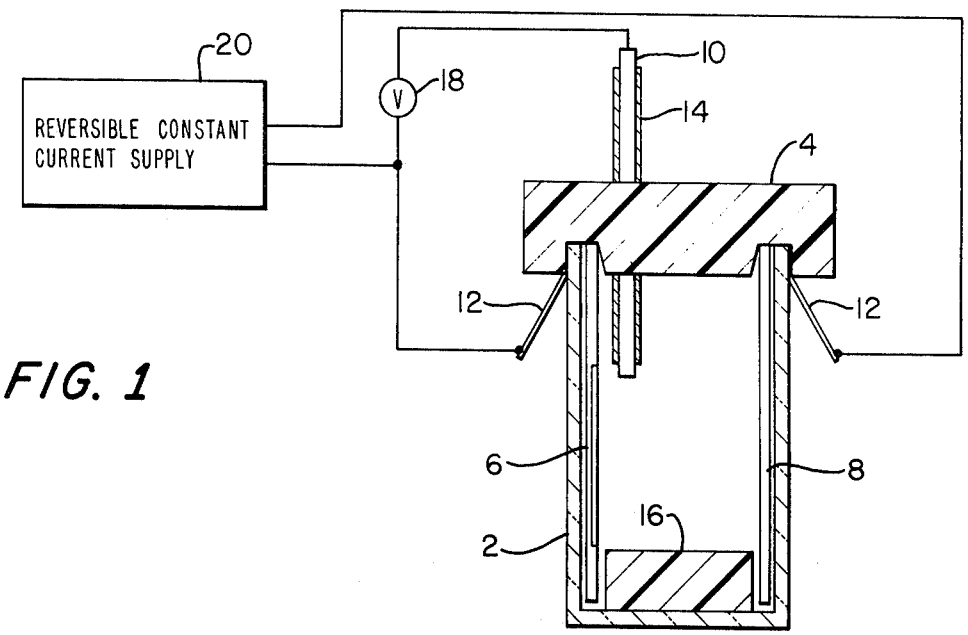
FIG. 1 is a schematic view of a half cell used in evaluating the cycling efficiency of Li electrodes in electrolytes made according to this invention.

According to this invention an aprotic organic electrolyte is provided in which the solvent comprises or consists of a selected alkyl homolog of tetrahydrofuran ($C_4H_8O$) or tetrahydropyran ($C_5H_{10}O$). More specifically, the solvent comprises or consists of a heterocyclic compound from one of the following classes of compounds:

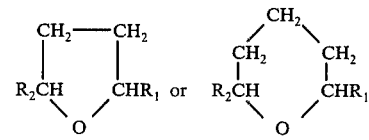

where $R_1$ and $R_2$ are both alkyl groups or one of them is an alkyl group and the other is hydrogen, said alkyl group being a methyl, ethyl, propyl, isopropyl, butyl, isobutyl or tertiary butyl group.

It has been determined that alkylation of THF, e.g., by addition of a methyl group to form 2-methyltetrahydrofuran tends to have a greater affect on its dielectric constant and specific conductivity than on its density and viscosity. Like THF, 2-methyltetrahydrofuran is liquid over the wide range of terrestial ambient temperatures. However, electrolytes made with 2-Me-THF are substantially less conductive than THF. It appears that the conductivity of the alkylated THF electrolyte varies with the number and location of the alkyl group that is added to the THF nucleus. Thus the conductivity of 1M lithium hexafluoroarsenate (LiAsF$_6$) electrolytes made with 3-methyltetrahydrofuran (3-Me-THF) and 2,5-dimethyltetrahydrofuran are greater and smaller respectively than electrolytes made with 2-Me-THF. All three solvents provide electrolytes with sufficient conductivity to satisfy the requirements of a low rate battery and 2-Me-THF and 3-Me-THF actually have sufficient conductivity for a high rate battery (in this context, a high rate battery is one having a discharge current density of at least 2.5 mA/cm$^2$).

However, while high conductivity is an important consideration in choosing an electrolyte for a lithium battery, the fundamental criterion in the selection process is stability toward lithium. In this regard it is significant that alkylation of a cyclic ether has an affect on its reactivity with respect to lithium. Thus, there are substantial differences in lithium reactivity among THF, 2-Me-THF, 3-Me-THF, and 2,5-di-Me-THF. Of these, 2-Me-THF and 2,5-di-Me-THF are paramount in lithium stability compared with THF and 3-Me-THF.

The advantages of alkylated electrolyte solvents selected in accordance with this invention are exemplified by the results of static and dynamic tests which were conducted with four selected solvents: THF, 2-Me-THF, 3-Me-THF and 2,5-di-Me-THF. The static tests included exposing electrolytes prepared from the foregoing cyclic ethers (solvent plus LiAsF$_6$ or LiClO$_4$) to lithium by incubating lithium foil with electrolyte at 71° C. (a temperature which in two weeks approximates one year of room temperature storage). The onset of lithium-electrolyte reaction visually manifests itself by corrosion on the lithium foil and concurrent yellowing of the electrolyte. The rate of reaction with lithium was compared from one ether to another and also among various levels of purification for a given ether.

Table I indicates the time of onset of lithium reaction for the four ethers at 71° C. using three different purification procedures identified as A, APA and DAPA. Procedure A involved passing the solvent through activated alumina prior to addition of the electrolyte salt; procedure APA was procedure A followed by pre-electrolysis of the solvent between two lithium electrodes and then another pass through activated alumina; and procedure DAPA involved distilling the solvent on a spinning band column followed by procedure APA.

substantially the same time as THF based electrolytes. Hence, the results of those static tests show that 2-Me-THF and 2,5-di-Me-THF are far superior to THF and 3-Me-THF as solvents for Li secondary battery applications.

Dynamic testing of electrolytes based on the same four cyclic ethers was achieved by galvanostatically cycling lithium to and from substrates of lithium and nickel at 25° C. ± 2° C., so that a fresh lithium surface came into contact with electrolyte on every cycle. The dynamic testing was accomplished with an experimental half cell as shown in FIG. 1. The experimental cell consisted of a rectangular glass container 2 (10 × 40 × 60 mm) having a polypropylene cover 4. Disposed within the container was a flat nickel working electrode 6, a flat lithium counter electrode 8, and a lithium foil reference electrode 10. The nickel working electrode and the lithium counterelectrode were supported by the polypropylene cover and each was provided with a nickel lead 12. The lithium foil reference electrode was disposed within a glass tube 14 and protruded from the open bottom end of the glass tube as shown. The nickel working electrode and the lithium counter electrode were kept apart and essentially parallel to one another by a polypropylene spacer 16 located at the bottom of the container. The nickel electrode, which measured 5.5 × 3.8 cm and had a thickness of 5 mils, was masked with Teflon tape so as to leave an exposed working area of 9 cm$^2$. The lithium counter electrode also measured 5.5 × 3.8 cm but had a thickness of 15 mils. A voltmeter 18 was connected across the nickel working electrode and the lithium reference electrode, while a constant current d.c. power supply 20 was connected across the nickel working electrode and the lithium counter electrode. The glass container was filled with an electrolyte consisting of a one molar concentration of lithium hexafluoroarsenate in each of the solvents tested. The galvonostatic cycling was conducted with the same current density for both plating and stripping operations. Lithium-electrolyte reactivity was noted in terms of a loss of cycling efficiency (the ratio of lithium stripped to lithium plated) with increasing cycle number.

Figure 3:
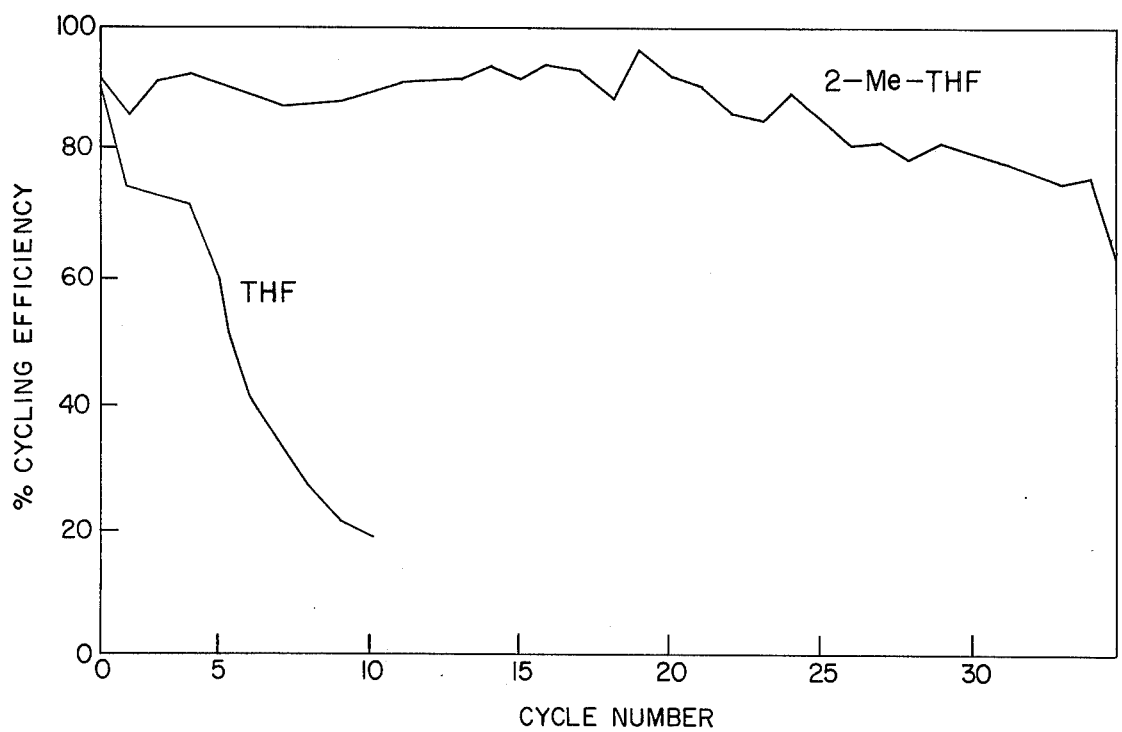
FIGS. 3 and 4 illustrate cycling efficiencies of THF and THF-homolog electrolytes.
Figure 4:
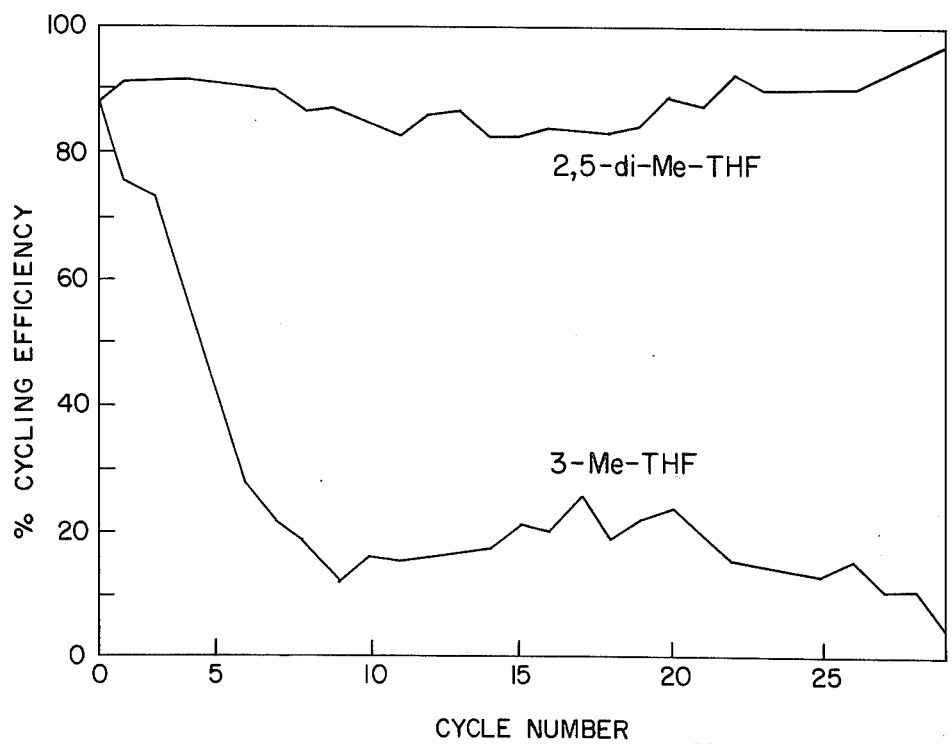

FIG. 3 illustrates the cycling efficiencies of the THF and 2-Me-THF electrolytes while FIG. 4 illustrates the cycling efficiencies of 2,5-di-Me-THF and 3-Me-THF electrolytes. In the case of the 2,5-di-Me-THF electrolyte, cycling was conducted at a current density of 0.7 mA/cm$^2$ and the charge plated (Q$_p$) was 1.125 coulombs/cm$^2$, while for the THF, 2-Me-THF and 3-Me- Table I

| Purification Procedure | 1M LiAsF$_6$/ THF | 1M LiAsF$_6$/ 2-Me-THF | 1M LiClO$_4$/ 2-Me-THF | 1M LiAsF$_6$/ 3-Me-THF | 1M LiAsF$_6$/ 2,5-di-Me-THF |
|---|---|---|---|---|---|
| None | 2 (16)$^{a,b}$ | — | — | — | — |
| A | 25 (28) | >6 Mo. | — | — | — |
| APA | 4 (7) | >6 Mo. | — | — | — |
| DAPA | — | >1 Mo. | >1 Mo. | 10 (4) | >3 Mo. |

$^a$Observable Li corrosion after 2 days; observable electrolyte coloration after 16 days.
$^b$THF (Burdick and Jackson, Distilled-in-glass) was used without further distillation. The APA preparation is equivalent to DAPA for the other solvents.

Referring to Table I, while THF based electrolyte reacts relatively early regardless of purification procedure, 2-Me-THF electrolytes with either LiAsF$_6$ or LiClO$_4$ tend to remain inert toward lithium for as much as six months or more, while 1M LiAsF$_6$/2,5-di-Me-THF is inactive for over three months. However, 3-Me-THF based electrolytes start to react with lithium at THF electrolytes the current density and charge plated values were 5mA/cm$^2$ and 1.125 coulombs/cm$^2$. Although 50-100 coulombs/cm$^2$ would normally be cycled in a practical, i.e., commercial cell, thin plates are useful in rapidly assessing the quality of a given electrolyte since cycling of thin plates many times exacerbates conditions leading to inefficiencies and electrode failure. In the test results illustrated in FIG. 3, on the 10th cycle run in THF-based electrolyte, about 75% of the lithium plated is encapsulated by films and lost to anodic dissolution. By comparison, only about 7% of lithium plated from 2-Me-THF based electrolyte is electrically isolated. While the electrolyte does degrade with cycle number, as evidenced by decay of cycling efficiency, the results represented by FIG. 3 clearly demonstrate that a 2-Me-THF based electrolyte provides a substantial and unexpected improvement in cycling efficiency in comparison to a THF-based electrolyte with identical solute and solute concentrations. FIG. 4 illustrates that 3-Me-THF behaves very much like THF in terms of cycling efficiency. In contrast, the di-methylated solvent manifested very good cycling efficiencies, albeit at low current densities. The 2,5-di-Me-THF electrolytes has substantially less conductivity than 3-Me-THF. The specific conductance of 1M $LiAsF_6$/2,5-di-Me-THF electrolyte at 25° C. is $0.19 \times 10^{-3}$ (ohm cm)$^{-1}$ compared to $7.4 \times 10^{-3}$ (ohm cm)$^{-1}$ for 1M $LiAsF_6$/3-Me-THF, about $13.0 \times 10^{-3}$ (ohm. cm)$^{-1}$ for THF and about $3.0 \times 10^{-3}$ (ohm. cm)$^{-1}$ for 2-Me-THF. Thus, while the dimethylated solvent affords good stability toward lithium at temperatures in the order of 70° C. and good cycling efficiency, its poor conductivity precludes its use as the sole solvent in a high rate battery, i.e., a battery having a discharging current density of 2.5 mA/cm$^2$ or greater.

While $LiAsF_6$ is the preferred ionic conductor solute for electrolytes made in accordance with this invention, lithium perchlorate is preferred as a second choice.

It is believed that the superior stability of 2-Me-THF and 2,5-di-Me-THF in contrast to THF and 3-Me-THF is due to the location of a methyl group in the 2-position of the oxolane ring. Alkyl groups (methyl, ethyl, propyl, etc.) are known to manifest positive inductive effects, i.e., they release electron density through covalent bonds. Thus, a methyl group in the 2-position (or methyl groups in the 2,5-positions) would be expected to raise the activation energy of the electron transfer reaction whereby an electron is transferred from lithium to the lowest unfilled molecular orbital (LUMO) centered on the electronegative oxygen atom of the oxolane ring. A similar group in the 3 position would be expected to have little effect on the LUMO since inductive effects are rapidly attenuated through saturated carbon-carbon bonds. Thus, 3-Me-THF and THF would be expected to behave similarly with respect to lithium, while 2-Me-THF and 2,5-di-Me-THF would be expected to show far less lithium reactivity. Similar behavior can be expected of 2-Me-THP and 2,6-di-Me-THP, and other higher alkyl homologs of THF and THP where the methyl group(s) is(are) replaced by other alkyl groups such as ethyl, propyl, isopropyl, butyl, isobutyl and tertiary butyl groups so as to give, for example, 2-ethylTHF, 2-ethylLTHP, 2,5-diethylTHF, 2,6-diethylTHP, etc. Alkylating THF or THP with alkyl groups having 5 or more carbons is not practical for cost and weight considerations.

For a high energy density ambient temperature battery embodying this invention, the negative electrode material preferably consists of lithium of as high purity as possible. Nevertheless, for certain other battery applications it may consist of a lithium alloy or amalgam. If a lithium alloy is used, it preferably is a lithium-tin, lithium-lead, lithium-gold, lithium-platinum, lithium-cadmium, lithium-mercury, lithium-zinc, lithium-silver, lithium-aluminum or lithium-magnesium alloy having at least about 65% lithium by weight. However, alloys having a smaller percentage of lithium may be satisfactory in certain cases.

For a high energy density ambient temperature battery, the positive electrode material preferably consists of titanium disulfide ($TiS_2$). Preferably this positive electrode material is made in accordance with the teachings of U.S. Pat. No. 4007055, issued Feb. 8, 1977 to M. Stanley Whittingham, or U.S. Pat. No. 3980761, issued Sept. 14, 1976 to Arthur H. Thompson et al. However, for other less stringent battery applications the positive electrode material may comprise other transition metal compounds and notably other insoluble chalcogenides (as for example mentioned in U.S. Pat. Nos. 4002492, 4007055 and 4009052) of titanium, zirconium, hafnium, vanadium, niobium, tantalum, molybdenum, tungsten, rhenium, platinum, germanium, iron, tin and lead, e.g., $TiS_3$, $TiSe_2$, $TiSe_3$, $ZrS_2$, $ZrS_3$, $HfS_2$, $HfS_3$, $VS_2$, $VS_3$, $NbS_2$, $NbS_3$, $TaS_2$, $TaS_3$, $ZrSe_2$, $ZrSe_3$, $HfSe_2$, $HfSe_3$, $VSe_2$, $VSe_3$, $NbSe_2$, $NbSe_3$, $TaSe_2$, $TaSe_3$, and alloys of the foregoing cations such as $ZrHfSe_2$. Other positive electrode materials may comprise mixed sulfides such as $Fe_xV_{1-x}S_2$ and $Cr_xV_{1-x}S_2$ ($x<1$) and sulfide compounds such as $NiPS_3$ and metal oxides such as $MoO_3$, $V_2O_5$ and $Cr_xO_y$ where $y/x$ is between 1.5 and 3. Soluble and partially soluble positive electrode materials also may be used, notably $I_2$, $Br_2$, $Cl_2$, $SO_2$, S, CuCl, $CuCl_2$, AgCl, $FeCl_2$, $FeCl_3$, and other transition metal halides. Other soluble positive electrode materials that may be used are lithium polysulfide ($Li_2S_n$) and organic compounds such as chloranil and fluoranil. In the case of $Li_2S_n$, it is preferred that $n$ be approximately 10. Titanium disulfide is the preferred positive electrode material because of electrical, weight and cost consideration.

Preferably the cathode structure consists of the positive electrode material deposited on a suitable substrate such as carbon, nickel, zinc, etc., but the cathode structure may consist entirely of the positive electrode material where the latter is capable of serving as its own current collector. A preferred cathode structure consists of titanium disulfide mixed with carbon and pressed onto a nickel substrate. In the case where the positive electrode material is soluble in the electrolyte to a significant extent, e.g., lithium polysulfide, any suitable electronic conductor which is not soluble in or reactive with the electrolyte may be used as the cathode current collector, e.g. carbon or nickel or carbon in a plastic matrix such as Teflon or polyethylene.

The concentration of the solute (ionic conductor) in the solvent is not critical. It is preferred to incorporate the minimum amount sufficient to yield the desired level of conductivity when the cell is fully charged. By way of example, the salt concentration should be such as to preferably give a specific conductivity of at least about $5 \times 10^{-5}$ ohm$^{-1}$cm$^{-1}$ at about 22° C. In practice, a 1.0 to 2.5 M concentration of solute in the solvent generally will provide a suitable level of ionic conductivity.

The solute is a compound which is ionically dissociable in the electrolyte solvent and may consist solely of an ionizable soluble salt whose cation is of the same metal (lithium) as the negative electrode material. The solute may consist solely of such a lithium compound, and cells using electrolytes made according to this invention with a lithium compound as the sole ionic conductor will function satisfactorily. However, if the solute has an anion component the same as that of the positive electrode, it is subject to the disadvantage that if the cell is overcharged the solute may be substantially depleted from the electrolyte, thereby adversely affecting its conductivity. Accordingly, it is preferred to use a solute with an anion different from that of the positive electrode, e.g., lithium hexafluoroarsenate or perchlorate, when the positive electrode is titanium disulfide. Alternatively, the solute may comprise any soluble lithium salt such as tetrabromoaluminate ($LiAlBr_4$), lithium thiocyanate, lithium tetrachloroaluminate ($LiAlCl_4$) lithium tetrafluoroborate, lithium bromide, lithium hexafluorophosphate, and lithium salts of organic acids such as trichloroacetic, trifluoromethanesulfonic, and formic acids.

In constructing practical cells in accordance with this invention, it is preferred that the positive and negative electrode members be formed as flat plates or foils and pressed together against a suitable non-conductive porous separator which has pores large enough to be permeable to the electrolyte. However, the invention also is applicable to cells where the positive and negative electrodes are widely spaced from one another with or without intervening separator means.

Figure 2:
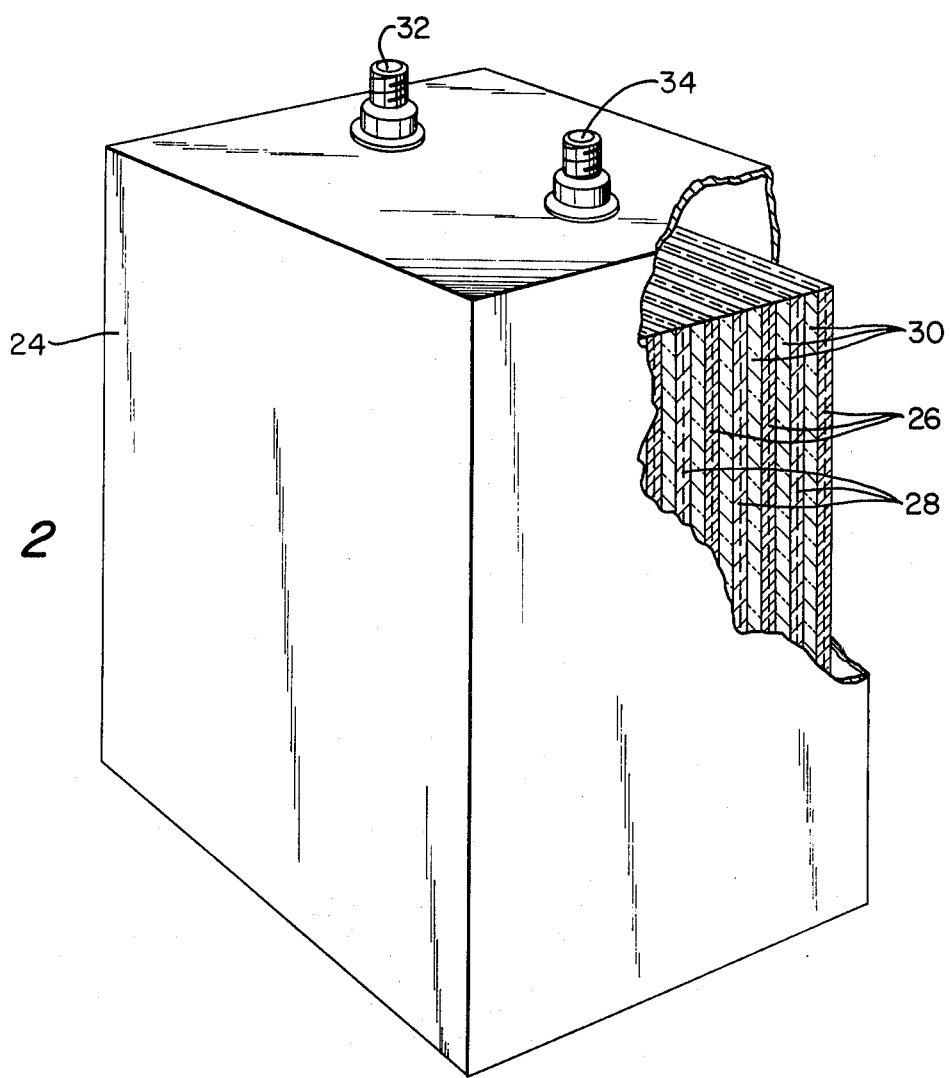
FIG. 2 is a schematic view of a preferred form of battery incorporating the present invention.

FIG. 2 illustrates a form of rechargeable single cell battery incorporating a preferred embodiment of the invention. The illustrated battery comprises a sealed battery case 24 within which is disposed a plurality of flat negative electrodes 26 consisting of essentially pure lithium deposited on nickel substrates, a plurality of flat positive electrodes 28 consisting of titanium disulfide deposited on expanded nickel, and a plurality of separators 30 in the form of flat porous mats made of microporous polypropylene film (Celgard) or glass fibers. The positive and negative electrodes are arranged alternatively with one another and a separator is disposed between each pair of positive and negative electrodes. Surrounding the array of electrodes and separators and filling the interstices of the separators is an electrolyte (not shown) which consists of a 1 molar solution of lithium hexafluoroarsenate in 2-methyl-tetrahydrofuran. The positive electrodes of the several cells are electrically coupled in parallel to a positive terminal 32 by suitable electrical conductors (not shown) in accordance with conventional battery fabrication technology, and the negative electrodes of the several cells are similarly connected to a negative battery terminal 34. The resulting single cell is rechargeable and has an open cell voltage of about 2.7 volts when fully charged, and is capable of being used at temperatures between about $-40°$ C. to about $150°$ C. Such a cell may be constructed so as to qualify as a high rate battery and has the advantage of having a longer shelf life than lithium batteries in which THF is the electrolyte solvent. Of course several such cells may be connected in series so as to provide a battery of higher voltage.

The liquid range of 2-Me-THP is displaced to higher values by approximately 20° when compared to 2-Me-THF, i.e., $-6°$ to $102°$ C. for the former; $-137°$ to $80°$ C. for the latter. To achieve low temperature operation with electrolytes composed of higher molecular weight cyclic ethers, diluents such as 1,2-dimethyloxyethane (DME), THF, and/or diethylether could be added. The role of a diluent is to maintain fluidity and ionic conductivity by lowering the viscosity. At temperatures near or at the boiling points of these solvents sealed cans would be employed.

It is to be understood that the invention is susceptible of a number of obvious modifications. Thus the electrolyte may comprise a mixture of solvents including THF or THP, e.g., a mixture of 2-Me-THF and 2-Me-THP or a mixture of either of them with THP or THF. Also electrolytes made in accordance with this invention may be used in cells where the anode essentially includes or is a material other than lithium, e.g., potassium, sodium, magnesium, calcium or zinc, or a mixture thereof with or without lithium. Furthermore while the invention is most advantageous in providing high energy density secondary cells, the electrolyte may be formulated so as to provide stable low or medium energy density cells. Still other modifications and advantages will be obvious to persons skilled in the art.

What is claimed is:

1. An electrochemical cell comprised of:
   positive and negative electrodes with said negative electrode comprising lithium; and
   an electrolyte providing an ionically conductive path between said electrodes comprised of an ionically dissociable lithium salt and a solvent for said salt consisting of a compound from the class consisting of 2-methyltetrahydrofuran, 2,5-dimethyltetrahydrofuran, 2-methyltetrahydropyran, 2,6-dimethyltetrahydropyran, and higher alkyl homologs thereof.

2. A rechargeable electrochemical cell comprising:
   positive and negative electrodes with said negative electrode consisting essentially of lithium as the active electrode materal; and
   an electrolyte providing an ionically conductive path between said electrodes, said electrolyte comprising an ionically dissociable lithium salt and a solvent for said salt which is primarily one or more compounds represented by the formula

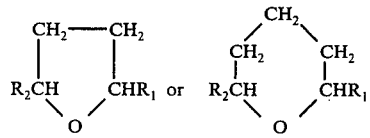

where $R_1$ and $R_2$ are both alkyl groups or one of them is an alkyl group and the other is hydrogen, said alkyl group being a methyl, ethyl, propyl, isopropyl, butyl, isobutyl or tertiary butyl group.

3. A cell according to claim 2 where the solvent comprises 2-methyltetrahydrofuran.

4. A cell according to claim 3 wherein the solvent consists of 2-methyltetrahydrofuran.

5. A cell according to claim 4 wherein the solvent consists of 2,5-dimethyltetrahydrofuran.

6. A cell according to claim 2 where the solvent comprises 2,5-dimethyltetrahydrofuran.

7. A rechargeable cell according to claim 2 in which the positive electrode is titanium disulfide or a lithium polysulfide.

8. A cell according to claim 2 wherein the solute is a lithium salt other than lithium perchlorate.

9. An electrolyte for use in an electrochemical cell having a lithium negative electrode, said electrolyte comprising an ionically dissociable solute in the form of a lithium salt and a solvent for said salt which comprises predominantly one or more members from the class consisting of compounds conforming to the formula

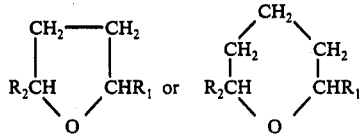

where $R_1$ and $R_2$ are both alkyl groups or one of them is an alkyl group and the other is hydrogen, said alkyl group being a methyl, ethyl, propyl, isopropyl, butyl, isobutyl or tertiary butyl group.

10. An electrolyte according to claim 9 where the solvent comprises 2-methyltetrahydrofuran.

11. An electrolyte according to claim 9 where the solvent comprises 2,5-dimethyltetrahydrofuran.

12. An electrolyte according to claim 9 where the solvent comprises only one cyclic ether, and that one cyclic ether is either 2 methyltetrahydrofuran or 2,5-dimethyltetrahydrofuran.

13. An electrolyte according to claim 12 where the solute consists of or comprises lithium perchlorate.

14. An electrolyte according to claim 12 where the solute consists of or comprises lithium hexafluoroarsenate.

15. An electrolyte according to claim 6 where the solute consists of or comprises one of the following: lithium hexafluorophosphate, lithium perchlorate, lithium hexafluoroarsenate, lithium tetrachloroaluminate, lithium bromide, lithium tetrafluoroborate, lithium tetrabromoaluminate, lithium thiocyanate, and lithium salts of trichloroacetic, trifluoroacetic, trifluoromethanesulfonic, and formic acids.

16. An electrolyte according to claim 15 wherein the solvent includes at least one of the following compounds: tetrahydrofuran, tetrahydropyran, 1,2-dimethyloxyethane and diethylether.

17. An electrolyte according to claim 16 wherein the solvent comprises 2-methyltetrahydrofuran and at least one of the following: tetrahydrofuran, 1,2-dimethyloxyethane, diethylether and tetrahydropyran.

18. An electrolyte according to claim 16 wherein the solvent comprises 2,5-dimethyltetrahydrofuran and at least one of the following: tetrahydrofuran, 1,2-dimethyloxyethane, diethylether and tetrahydropyran.

19. An electrolyte according to claim 9 wherein the solute consists of or comprises one of the following: lithium hexafluorophosphate, lithium hexafluoroarsenate, lithium tetrachloroaluminate, lithium bromide, lithium tetrafluoroborate, lithium tetrabromoaluminate, lithium thiocyanate, and lithium salts of trichloroacetic, trifluoroacetic, trifluoromethanesulfonic, and formic acids.

20. An electrolyte according to claim 19 wherein the solvent consists of either or both members of the group consisting of 2-methyltetrahydrofuran and 2,5-dimethyltetrahydrofuran.

* * * * *